3,494,736
PROCESS FOR REMOVING SILICON, ALUMINUM AND FLUORINE FROM WET PROCESS PHOSPHORIC ACID
John N. Carothers and Rudolph J. Hurka, Jr., both of 1629 Lady Marion Lane NE., Atlanta, Ga. 30309
Continuation-in-part of application Ser. No. 501,526, Oct. 22, 1965. This application Aug. 26, 1968, Ser. No. 755,469
Int. Cl. C01b 25/22
U.S. Cl. 23—165 — 4 Claims

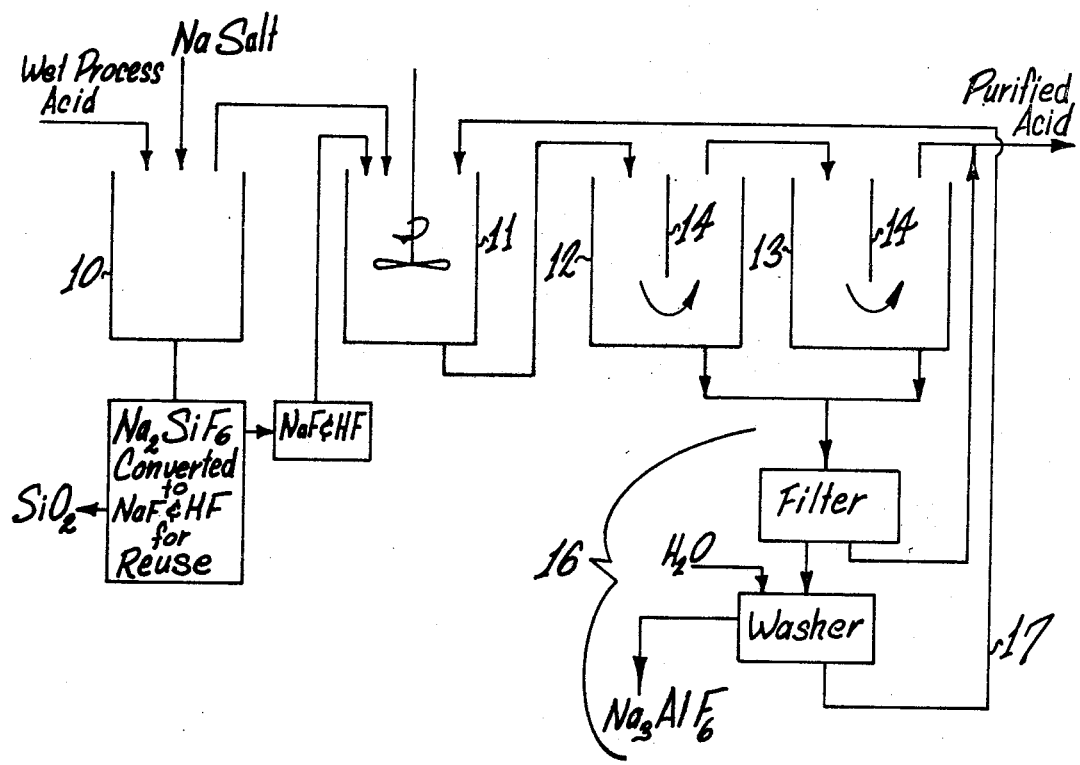

ABSTRACT OF THE DISCLOSURE

Process for removing silicon, aluminum and fluorine from wet process phosphoric acid in which any silicon present in forms other than fluosilicate is first converted to fluosilicate ion. Sodiom salt then added to acid in amount to provide 2 moles sodium ion for each mole fluosilicate ion plus at least 0.5 part sodium ion per 100 parts acid. Sodium fluosilicate precipitated and separated from acid. Proportioned streams of silicon free acid and a fluoride are then introduced into aqueous phosphoric acid medium while maintaining medium at fluorine content less than 0.3 part per 100 parts medium, aluminum content less than 0.1 part per 100 parts medium and sodium ion content between 1.4 and 3 parts per 100 parts medium to form sodium aluminum fluoride which is then separated.

---

This application is a continuation-in-part of our previously filed application Ser. No. 501,526, filed Oct. 22, 1965, and now abandoned, and relates to the removal of silicon, aluminum and fluorine from phosphoric acid produced by the so-called wet process in which phosphate rock is reacted with sulfuric acid to produce phosphoric acid and calcium sulfate, the latter as gypsum or lower hydrates. Such acids vary considerably in composition and may contain from somewhat less than 25% to somewhat more than 32% $P_2O_5$; from less than 1% to more than 3% F.; from less than 0.2% to more than 1% Al; from less than 0.2% to around 1% Si; and, in addition, other impurities such as for example, iron, calcium, magnesium, sodium, potassium, and sulfate.

The principal object of our invention are to provide an economical process for the purificaton of wet-process phosphoric acid wherein substantially all of the Si, whether initially present in the acid as fluosilicate or as silicic acid or silicates in soluton, and substantially all of the Al, are removed from the phosphoric acid with no substantial loss of $P_2O_5$; wherein the F content is reduced to low residual levels of fluorine; wherein the F is recovered, in large part, in the form of directly usable compounds; wherein the reagents are recaptured, in large part, for reuse in the process; and particularly, wherein the process lends itself to economical continuous operation.

As is well known in the art to which our invention relates, the fluorine content of wet-process phosphoric acid is objectionable due to its toxic nature, and heretofore has been difficult and expensive to remove. The aluminum content of wet-process phosphoric acid is objectionable not only because of its being an important constituent of sludges that form in wet-process phosphoric acid, as produced and on concentration, but also because of the attendant loss of $P_2O_5$ in the aluminum phosphate-containing sludges and because the presence of aluminum hinders the removal of other impurities. Lehr et al. (J. Agr. Food Chem. 14, 27–33, 1966) state:

(Page 32) "Treatment of the acid with sodium salts would increase the precipitation of fluosilicate and leave less fluorine in the acid. On the other hand, addition of fluosilicate would precipitate sodium and potassium as $(Na, K)_2SiF_6$ and so decrease the formation of sludge when the acid was concentrated to merchant grade. Neither of these treatments, however, removes any iron or aluminum, the impurities that are most troublesome in subsequent proceeding of the acid"; and, (page 33) "Since the major constituents of the troublesome sludges are iron and aluminum, it is desirable to remove these metals from the acid as early in its production as is convenient."

We have discovered that by first removing from wet-process phosphoric acid substantially all of the silicon, both the silicon present in the acid as fluosilicate and the silicon present as silicic acid, or silicate in solution, the aluminum present in the acid then may be caused to react with fluoride and sodium ion to produce a readily separable crystalline sodium aluminum fluoride compound which is directly marketable.

Briefly, our invention comprises the following sequence of steps:

(a) Adding to the acid a sodium salt selected from the group consisting of sodium orthophosphate and sodium carbonate, preferably the latter, to react with the silicon present in the acid as fluosilicate and precipitate it as sodium fluosilicate, and to provide sodium ion in the acid in addition to the sodium ion required to react with and precipitate the fluosilicate. In event the acid does not contain six moles of fluoride for each mole of silicon therein plus 1 to 2.5 moles of fluoride for each mole of aluminum therein, sufficient fluoride is added prior to adding the sodium salt to make up the deficiency.

(b) Separating the sodium fluosilicate from the acid, the acid then containing at least 0.5 part sodium ion per 100 parts acid.

(c) Introducing hydrofluoric acid and/or a sodium salt of hydrofluoric acid, and, the phosphoric acid freed of silicon, into an aqueous phosphoric acid medium having a fluorine content of less than 0.3 part fluoride per 100 parts acid, an aluminum content of less than 0.1 part aluminum per 100 parts acid, and a sodium ion content maintained between 1.4 and 3 parts sodium ion per 100 parts acid. A readily separable crystalline compound is formed containing sodium, aluminum and fluoride in substantially the proportions of 3 moles of sodium and 6 moles fluoride for each mole of aluminum.

(d) Separating the sodium-aluminum-fluoride compound from the acid.

The sodium fluosilicate recovered in step (b) of the process may be converted to hydrofluoric acid and its sodium salts by known means for re-use in the process.

Although it is probably generally considered in the art to which this process relates that treatment of wet-process phosphoric acid with sodium salts brings about the precipitation of sodium fluosilicate, we have found that when sodium fluoride is added directly to wet-process phosphoric acid containing Al, Si and F, a difficultly separable material is obtained with no effective purification of the acid with respect to silicon, aluminum or fluorine. We have found that this difficulty is overcome by first removing substantially all of the silicon present in the acid; the silicon is removed in the form of sodium fluosilicate. The acid, freed of silicon, but containing aluminum, may then be reacted with sodium fluoride and/or hydrofluoric acid in the manner hereinafter described to produce a sodium-aluminum-fluoride compound, substantially removing all of the aluminum from the acid, and lowering the fluorine content of the acid to low residual levels.

In what follows when "parts" are mentioned, parts by weight are intended.

In order to remove substantially all of the silicon from wet-process phosphoric acid, any silicon present in the acid as silicic acid or dissolved silicates is first converted to fluosilicate ion by use of sufficient fluoride in the form of hydrofluoric acid to provide, together with the fluorine already present in the phosphoric acid, 6 moles fluoride for each mole of silicon present, plus sufficient fluoride, in addition, to provide between 1 and 2.5 moles fluoride for each mole of aluminum present in the phosphoric acid. In the foregoing, the proportion 6 moles fluoride for each mole of silicon is equivalent to approximately 4.059 parts fluoride for 1 part silicon, and the proportion specifying between 1 and 2.5 moles fluoride for each mole of aluminum is equivalent to approximately between 0.704 and 1.760 parts fluoride for 1 part aluminum. A sodium salt, sodium carbonate or sodium orthophosphate, is then added to the acid in amount sufficient both to provide 2 moles sodium ion for each mole fluosilicate ion (the foregoing proportion being equivalent to approximately 0.324 part sodium ion for 1 part fluosilicate ion) and, in addition, between 0.5 and 4 parts sodium ion for each 100 parts acid being treated, the latter quantity of sodium ion acting to repress the solubility of sodium fluosilicate at the temperature of operation. The temperature of operation is not critical and maybe in the range 60°–70° C., the temperature at which wet-process phosphoric acid is usually produced. Sodium fluosilicate precipitates as a crystalline solid which is then separated from the acid. The acid from which the solid sodium fluosilicate has been separated then contains between 0.5 and 4 parts sodium ion for each 100 parts acid. Thus, substantially all of the silicon initially present in the wet-process phosphoric acid, whether initially present as fluosilicate, or as silicic acid or silicates in solution, is removed from the phosphoric acid as sodium fluosilicate.

The phosphoric acid, freed of silicon, but containing aluminum, is next treated with hydrofluoric acid and/or its sodium salts to produce a sodium-aluminum-fluoride compound containing the components in proportions approximating those of cryolite, $Na_3AlF_6$. Our preferred manner of carrying out this step of the process is one in which the sodium-aluminum-fluoride compound is formed and crystallized in an aqueous phosphoric acid medium in which the aluminum and fluoride component concentrations are at all times at a low level, that is, the aluminum concentration being less than 0.1 part Al per 100 parts phosphoric acid medium, and the fluoride concentration being less than 0.3 part F per 100 parts phosphoric acid medium, and the sodium ion concentration being substantially constant and in the range 1.4 to 3 parts sodium ion per 100 parts phosphoric acid medium. We accordingly combine the silicon-free, aluminum-containing acid and the fluoride component by adding them simultaneously in correctly proportioned streams to the phosphoric acid medium described above. As the process is being carried on, sodium-aluminum-fluoride crystallizes, the crystalline solid and the phosphoric acid medium in which it is crystallized forming a slurry. The aqueous phase of said slurry is the phosphoric acid medium, and the composition of said aqueous phase remains substantially unchanged as the components of the sodium-aluminum-fluoride compound are added and crystallize out. The crystalline compound may be withdrawn continuously or intermittently, as will be described later. At the start up of operations, the phosphoric acid medium to which the correctly proportioned streams of silicon-free, aluminum-containing wet-process phosphoric acid and the fluoride component are added may be formed from aluminum- and silicon-free phosphoric acid in any suitable way known to the art.

It is very important that the proportioned component streams of silicon-free, aluminum-containing phosphoric acid, and the fluoride component, be added to the aqueous phosphoric acid medium, in which the crystallization of the sodium-aluminum-fluoride compound is taking place, at such a rate that as the compound crystallizes the concentrations of the aluminum and fluoride components in the aqueous phase of the slurry remain low; that is, less than 0.1 part Al per 100 parts aqueous phase, and the fluoride component less than 0.3 part F per 100 parts aqueous phase. This provides conditions in which the sodium-aluminum-fluoride compound is formed and crystallized in a solution in which the Al and F components are at all times low. The crystallization of the sodium-aluminum fluoride compound thus takes place under end point conditions.

We have found, in many experiments, that substantially all of the silicon and aluminum are removed from the acid, and the fluorine content of the acid is reduced to as low as 0.11 part F per 100 parts acid, that is, the residual fluorine concentration in the acid is 0.11%. Thus, in the case of acids of $P_2O_5$ content of 25% or higher, the phosphorus to fluorine weight ratio in the purified acid is 100/1 or greater.

Our improved process lends itself particularly to continuous operation. Referring to the accompanying flow sheet, we provide a plurality of mixing and settling tanks indicated by the numerals 10–13, each of which is preferably of a capacity to hold several hours' production of a phosphoric acid plant. In the first of these tanks, 10, raw wet-process phosphoric acid and a sodium salt, either sodium carbonate or sodium orthophosphate, are added in proper proportions for the sodium salt to provide sodium ion to react with the fluosilicate in the acid and from sodium fluosilicate, which may be separated from the acid by any convenient means, and in addition to provide, after separation of the sodium fluosilicate, between 0.5 and 4 parts sodium ion per 100 parts acid.

After separation of the sodium fluosilicate, the acid, freed of silicon but containing aluminum, and, hydrofluoric acid and/or its sodium salts, are introduced into mixing tank 11 which already contains an aqueous phosphoric acid medium in which the crystallization of the sodium-aluminum-fluoride compound occurs. The composition of the solution, that is, of the phosphoric acid medium, is now that of the wet-process phosphoric acid with respect to $P_2O_5$, and contains Al in the range less than 0.1 part Al per 100 parts solution, and contains F in the range less than 0.3 part F per 100 parts solution, and contains sodium ion in the range 1.4–3 parts Na per 100 parts solution. The sodium-aluminum-fluoride compound heretofore described forms and crystallizes from the solution, forming a slurry with the aqueous medium. During this addition the mixture is subjected to rapid agitation. The silicon-free, aluminum-containing acid and the fluoride component are introduced simultaneously and continuously in streams proportioned to form the sodium-aluminum-fluoride compound. By operating in this manner the purification of the phosphoric acid is conducted in an aqueous medium, consisting of, as the process continues, the purified acid itself, in which the concentrations of aluminum and fluoride are at all times low, and the sodium ion concentration is maintained in the range 1.4–3 parts sodium ion per 100 parts of the solution phase of the slurry. The sodium ion is maintained in the aforesaid concentration range by introducing sufficient sodium salt either as sodium carbonate or sodium orthophosphate at the beginning of the process, or by introducing the fluoride component into the phosphoric acid medium, in which crystallization of the sodium-aluminum-fluoride compound takes place, as a sodium salt of hydrofluoric acid, or by both of the foregoing means. The sodium-aluminum-fluoride compound crystallizes continuously and remains in suspension in tank 11 as the slurry is stirred. The addition of the fluoride component and the silicon-free, aluminum-containing acid is continued, and the slurry is withdrawn from tank 11 and introduced into tank 12 preferably at the same rate as silicon-free, aluminum-containing acid and fluoride are introduced into tank 11. From tank 12, the slurry is transferred as by decantation to tank 13 during which time crystals may be removed continuously or intermittently. Tanks 12 and 13 shown on the flow sheet are preferably of the divided type in which liquid flows down under a partition 14, and up the other side to be decanted. The acid leaving the last tank is the finished product except in cases where final clarification is needed. The sodium-aluminum-fluoride removed from the several tanks is conveyed to a common filtering and washing station 16. The solid sodium-aluminum-fluoride, after washing and drying is a finished, marketable product. The washings are returned to the mixing and settling tank 11 for recycle. The sodium fluosilicate formed in the first sep of the process may be converted by known means, not shown, as suggested in Winter Patent No. 2,558,786, dated Mar. 11, 1952, to sodium fluoride and hydrofluoric acid for re-use in the process. In this process $SiO_2$ is separated.

The acid produced by our improved process contains a small sodium ion concentration but this is not objectionable in any process for the production of phosphates in which the phosphates are precipitated out and is a distinct advantage in the production of soda phosphates.

From the foregoing it will be apparent that we have devised a process for the removal of Si, Al and F directly from wet-process phosphoric acid which is simple and economical and which may be readily carried out continuously. The sodium ion employed to react with the fluosilicate in the acid and form sodium fluosilicate is recaptured and reused later in the process, and the fluorine is recovered, in large part, in marketable form.

What we claim is:

1. In a process for the substantially complete removal of silicon, aluminum and fluorine from wet-process phosphoric acid produced by reacting phosphate rock with sulfuric acid and separating the resulting calcium sulfate therefrom, comprising the following steps in the sequence indicated:
  (a) adding to the wet-process phosphoric acid hydrofluoric acid in an amount to provide, together with the fluorine already present in said wet-process phosphoric acid, 6 moles fluoride for each mole of silicon present plus from 1 to 2.5 moles fluoride for each mole of aluminum present in said phosphoric acid to convert to fluosilicate ion any silicon present in said phosphoric acid in forms other than as fluosilicate,
  (b) adding to the phosphoric acid resulting from step (a) a sodium salt selected from the group consisting of sodium orthophosphate and sodium carbonate in an amount to provide 2 moles sodium ion for each mole fluosilicate ion present in the phosphoric acid and in addition to provide at least 0.5 part sodium ion per 100 parts phosphoric acid, to form and precipitate sodium fluosilicate,
  (c) separating the sodium fluosilicate from the phosphoric acid, thus leaving a silicon free acid then containing at least 0.5 part sodium ion per 100 parts acid,
  (d) introducing proportioned streams of the silicon-free phosphoric acid produced in (c), above, and at least one fluoride selected from the group consisting of hydrofluoric acid and its sodium salts, into an aqueous phosphoric acid medium while maintaining said phosphoric acid meduim at a fluorine content of less than 0.3 part fluorine per 100 parts of said medium, an aluminum content of less than 0.1 part aluminum per 100 parts of said medium, and a sodium content between 1.4 and 3 parts sodium ion per 100 parts of said medium, to form sodium aluminum fluoride, and,
  (e) separating the sodium aluminum fluoride from the aqueous phosphoric acid medium.

2. The process defined in claim 1 in which the fluoride is introduced into said medium in an amount to provide at least six moles fluoride per mole of aluminum in the silicon-free phosphoric acid.

3. The process defined in claim 1 in which the silicon-free acid separated in step (c) contains between 0.5 and 4 parts sodium ion per 100 parts acid.

4. The process defined in claim 3 which is carried out in a continuous manner by passing the reacting components continuously through a succession of mixing and settling tanks, removing the solids precipitated out from the tanks, and converting the recovered sodium fluosilicate to hydrofluoric acid and sodium salts of hydrofluoric acid for re-use in the process.

References Cited

UNITED STATES PATENTS

| 1,676,556 | 7/1928 | Howard | 23—165 |
| 1,850,017 | 3/1932 | Lehrecke | 23—165 |
| 3,107,145 | 10/1963 | Hinkle et al. | 23—165 |
| 3,379,501 | 4/1968 | Treitler | 23—165 |

HERBERT T. CARTER, Primary Examiner

U.S. Cl. X.R.

23—88, 110

UNITED STATES PATENT OFFICE
CERTIFICATE OF CORRECTION

Patent No. 3,494,736                  February 10, 1970

John N. Carothers et al.

It is certified that error appears in the above identified patent and that said Letters Patent are hereby corrected as shown below:

Column 1, line 18, "Sodiom" should read -- Sodium --; line 46, "object" should read -- objects --; line 49, "soluton" should read -- solution --. Column 2, line 7, "proceeding" should read -- processing --. Column 4, line 32, "from" should read -- form --. Column 5, line 14, "sep" should read -- step --. Column 6, line 15, "meduim" should read -- medium --.

Signed and sealed this 24th day of November 1970.

(SEAL)
Attest:

Edward M. Fletcher, Jr.               WILLIAM E. SCHUYLER, JR.
Attesting Officer                    Commissioner of Patents